Figure 1:
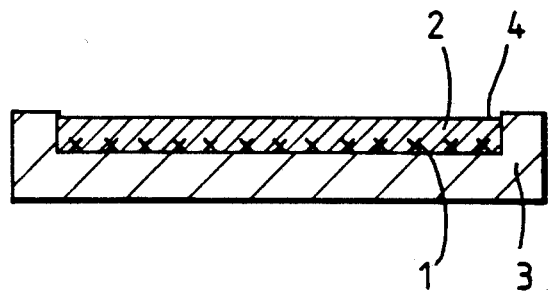

United States Patent [19]

Bridger et al.

[11] Patent Number: 5,217,587
[45] Date of Patent: Jun. 8, 1993

[54] ELECTRODES

[75] Inventors: Nevill J. Bridger, Hermitage; Andrew D. Turner, Abingdon, both of United Kingdom

[73] Assignee: United Kingdom Atomic Energy Authority, Oxfordshire, England

[21] Appl. No.: 648,870

[22] Filed: Jan. 31, 1991

[30] Foreign Application Priority Data

Feb. 1, 1990 [GB] United Kingdom ............... 9002247

[51] Int. Cl.$^5$ ............................................. C02F 1/46
[52] U.S. Cl. ............................ 204/149; 204/182.4; 204/280; 204/131; 204/130
[58] Field of Search ............... 204/149, 182.4, 280, 204/131, 130

[56] References Cited

U.S. PATENT DOCUMENTS 3,687,829  8/1972  Factor .................................. 204/149

FOREIGN PATENT DOCUMENTS

| 1169230 | 10/1969 | United Kingdom . |
| 1220456 | 1/1971  | United Kingdom . |
| 1226507 | 3/1971  | United Kingdom . |
| 1247732 | 9/1971  | United Kingdom . |
| 1435477 | 5/1976  | United Kingdom . |
| 1536887 | 12/1978 | United Kingdom . |
| 2073252 | 10/1981 | United Kingdom . |
| 2150598 | 7/1985  | United Kingdom . |

*Primary Examiner*—John Niebling
*Assistant Examiner*—Arun S. Phasge
*Attorney, Agent, or Firm*—William R. Hinds

[57] ABSTRACT

An electrode used in electrochemical deionization comprises a current feeder disposed asymmetrically in an ion exchange material bonded into a coherant structure i.e. more of the ion exchange material adheres to one side of the current feeder than to the other side. The ion exchange material may be bonded by being provided in intimate admixture with a binder. Such an electrode offers manufacturing ease and the ability to be scaled up in multi-modular form.

7 Claims, 1 Drawing Sheet

ELECTRODES

The electrochemical removal of ions from aqueous solutions onto ion-exchange materials, which may be referred to as electrochemical ion exchange or electrochemical deionization, is known for example from UK patents GB 1 247 732 and GB 2 150 598. It involves establishing an electrochemical cell comprising the aqueous solution as electrolyte, a working electrode and a counter electrode, where at least the working electrode incorporates an ion exchange material such as a resin, and applying a D.C. voltage between the electrodes. For example, to remove cations from the solution, the working electrode incorporates a cation responsive ion exchange material and is made the cathode. A localized change of pH is thereby produced at the electrode due to generation of $OH^-$ ions which in turn produce active sites thereon for absorption of cations from the aqueous solution. Subsequent reversal of the voltage enables the absorbed ions to be eluted, so the working electrode can be readily regenerated.

The working electrode may comprise a current feeder support carrying an intimate mixture of an ion exchange material, and a binder. The mixture may also include an electrically conducting material. Examples of suitable materials are carbon (e.g. in the form of carbon felt) or platinised titanium (e.g. in the form of an expanded metal mesh) as the current feeder; an ion exchange resin as the ion exchange material; graphite as the electrically conducting material; and an adhesive elastomer as the binder.

A particular problem in the use of such a working electrode is to maintain adhesion between the current feeder and the mixture, as in use, gas butbles may form between them and reduce electrode performance. A way of ameliorating the above problem is provided in GB-B-2 150 598 (corresponding to US-A-4 548 695) where an electrode, comprising a current feeder support carrying an intimate mixture of an ion exchange material and a binder, has an inert, electrolyte-permeable outer envelope adhering to the mixture for maintaining the mixture in contact with the current feeder during use of the electrode in electrochemical deionization.

The above-described electrode may, however, need a restrainer to force gases produced at the interface of the current feeder and the ion exchange material to be expelled from the electrode at its edges and not cause distortion of the ion exchange material. Further problems with the above-described electrode are that its production may require more than one stage, that it may be difficult to make flat electrode surfaces, and that scale-up may be difficult.

The present invention ameliorates one or more of the above problems by providing an electrode in asymmetric form. Thus, the invention provides an electrode for use in electrochemical deionisation comprising a current feeder in intimate contact with an ion exchange material bonded into a coherent structure, wherein at every part of the current feeder the thickness of material on one surface of the feeder is much less than on the other surface of the feeder. If desired, the electrode may also have an inert, electrolyte-permeable outer envelope adhering to one or both external surfaces of the said coherent structure. The ion exchange material may be bonded by being provided in intimate admixture with a binder.

Preferably the ion exchange material is arranged to provide a uniformly thin layer on one surface of the feeder, and a uniformly thicker layer on the other surface. The ion exchange material may be arranged on only one surface of the current feeder, the opposite surface of the current feeder being substantially devoid of ion exchange material. The electrode may be supported in a support module shaped to receive the electrode so that fluid flowing past or through the module contacts an exposed surface of the electrode. It is also preferred that a plurality of such modules can be assembled together to form a multi-cell electrochemical ion exchange apparatus having one or more pathways for fluid to be deionised defined therein and communicating with the electrodes.

The electrode of the invention may be made by coating the current feeder with an intimate mixture of the ion exchange material and a solution of the binder in a suitable solvent to give a "wet" electrode; applying the envelope thereto, if required, so that the binder solution enters (or passes through) the pores of the envelope; and drying to give the final electrode. The binder may be an adhesive elastomer.

The electrode can be made in a single step moulding process in which the mixture is added to a mould in which the current feeder is first positioned. Once the solvent has evaporated, the electrode can be removed from the mould. Preferably the electrode (and the mould) is rectangular, while the support module defines a channel to accommodate the electrode, the channel being of the same width as the electrode but of greater length, and defining inlet and outlet ports for the liquid at each end of the channel.

In use of the electrode, gases are released adjacent the rear of the electrode thus ensuring that the electrode does not expand and obviating the need for a constraint.

The outer envelope, if present, has to be electrolyte-permeable in order to allow electrolyte to pass therethrough to permit satisfactory contact between an electrolyte and the ion exchange material in use of the electrode in an electrochemical cell. For example, the envelope may be in the form of a cloth having open pores of size of the order of several micrometers (e.g. less than 20 micrometers). By "inert" is meant that the material of the envelope does not react with any of the reagents or other materials which may be present in use of the electrode in an electrochemical cell and, in particular, does not take part in any electrochemical reaction therein. A specific example of a material for the outer envelope is a non-woven polyamide cloth having, for example a maximum pore size of 18 micrometers. The presence of such a cloth at the rear of the current feeder can aid removal of an electrode from a mould during manufacture.

The current feeder may, for example be an amorphous carbon felt or a graphite felt or a metal mesh of, for example stainless steel, platinized titanium, nickel or platinum. Metal current feeders are preferred because of their greater stability during repeated cycling. The ion exchange material may, for example be an ion exchange material such as known in the art, for example AMBERLITE (Registered Trade Mark) IRC50 and 84 (ex Rohm and Haas) and zirconium phosphate (ex Magnesium Elektron). It is preferably, but not essentially, present in finely divided form, for example in a particle size of the order of a hundred micrometers. The intimate mixture may also include an electrically conducting material such as graphite in finely divided form.

Subject to appropriate choice of materials and operating conditions, the electrode of the invention may be used as a working electrode in an electrochemical cell for electrochemical deionization of cations or anions or both, for example in water softening or removal of heavy metal cations. As already indicated, the electrode of the invention may be made in a form suitable for scale-up.

In accordance with the invention, a method of performing electrochemical ion exchange on an electrolyte comprises the steps of:

(a) providing a counter electrode, (b) providing a working electrode having front and rear major surfaces and comprising a mixture of a particulate ion exchange material and a binder in contact with a permeable current feeder which has front and rear major surfaces, the mixture and the current feeder being bonded into a coherent structure such that at every part of the current feeder the thickness of the mixture on one major surface of the current feeder is less than that on the other major surface of the current feeder, such that gas electrogenerated at the current feeder during electrochemical ion exchange in contact with an electrolyte will diffuse from the current feeder into the electrolyte preferentially through that portion of the said mixture which is less thick, (c) contacting the electrolyte with said working electrode and said counter electrode, (d) and applying a voltage between the electrodes to induce electrochemical ion exchange, whereby gas electrogenerated at said current feeder diffuses therefrom into the electrolyte preferentially through that portion of the said mixture which is less thick.

Figure 2:
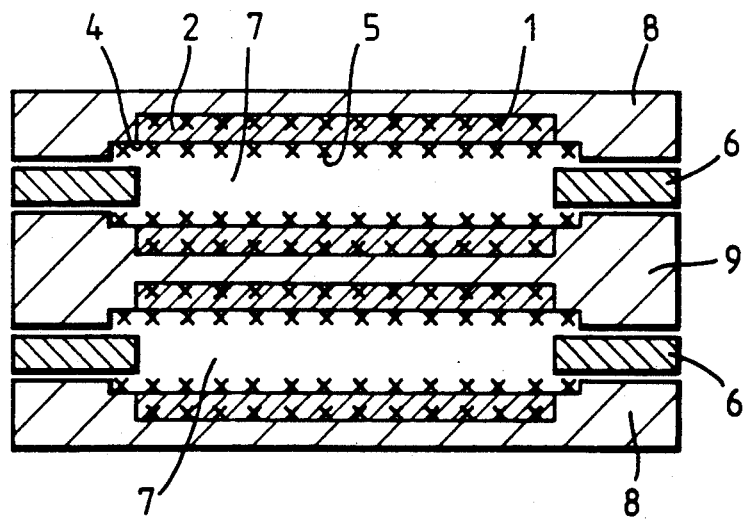

The invention will now be further described, by way of example only, and with reference to the accompanying drawings wherein:

FIG. 1 is a schematic sectional diagram of an electrode according to the invention; and FIG. 2 is a schematic sectional diagram of a multi-modular electrochemical deionisation apparatus embodying more than one electrode of the invention.

Referring to FIG. 1, in making an electrode a current feeder 1 is placed in a rectangular recess in a mould 3, and is then covered with a wet mixture of binder, solvent and ion exchange material 2. Preferably the mould 3 is covered by mould-release paper, and to further aid removal of the electrode an electrolyte-permeable cloth is placed in the mould 3 under the current feeder 1. The exposed surface 4 of the ion exchange material 2 carries another electrolyte permeable cloth (not shown). The wet mixture permeates the current feeder 1, but when the solvent evaporates the ion exchange material 2 is asymmetrically distributed, with the bulk of the material 2 on the top surface of the feeder 1 and very little on the rear surface. Typically there might be less than 0.5 mm on the rear surface, possibly between about 0.1 and 0.4 mm, although the thickness may vary from place to place since the current feeder 1 may not be flat, whereas there might be about 5 mm on the front (top) surface. The preferred thickness on the front surface of the feeder 1 varies with different ion exchange materials 2, as this thickness determines both the theoretical ion exchange capacity of the electrode, and its electrical resistance in operation. When the electrode is dry it is removed from the mould 3. The edges of the current feeder 1 may then be insulated with insulating tape to ensure short-circuits cannot occur.

Referring now to FIG. 2, the electrode so made is then clipped between a polyethene sheet (not shown) and a counter electrode 5 and located in a flow channel 7 for a liquid to be treated. In the apparatus of FIG. 2 two flow channels 7 are depicted, defined by recesses in opposed faces of polymethylmethacrylate sheets 8, 9. The sheets 8, 9 are sealed together by rubber gaskets 6, and clamped tight with bolts (not shown). The recesses in the sheets 8, 9 are of the same width as the electrodes, but about 10 cm longer, so there is an inlet region and an outlet region at the ends of the flow channels 7. One electrode 1, 2 along with its associated counter-electrode 5 is located in each recess, so there are two such electrode assemblies 1, 2, 5 in each flow channel 7. It will be appreciated that since the apparatus is of modular construction, any desired number of flow channels 7 may be created by providing sufficient sheets 9, gaskets 6, and electrode assemblies 1, 2, 5.

For operation of the apparatus of FIG. 2, electrical connections (not shown) are provided for the electrodes. Also provided is an inlet arrangement (not shown) for causing electrolyte to flow through the flow channels 7 (perpendicular to the plane of FIG. 2). In operation, a voltage is applied to the electrodes 1, 5 and electrolyte is passed through the flow channels 7 for ions to be removed therefrom—for example, cations where the ion exchange material 2 is a cation absorber, and deionisation where the material 2 is a cation absorber at a cathode and an anion absorber at an anode. Gas created at the current feeder 1 can diffuse through the thin layer of material 2 at the rear of the electrode, to escape.

EXAMPLE (with reference to FIGS. 1 and 2)

A platinised-titanium based electrode (100 cm×20 cm) was prepared by placing a platinised titanium mesh as current feeder 1 in a PERSPEX (Registered Trade Mark) polymethylmethacrylate mould 3 and adding thereto a mixture comprising zirconium phosphate ion exchange material 2 (840 g; particle size about 20 micrometers; ex Magnesium Elektron) mixed into a solution of a butadiene/styrene copolymer elastomer (148 g) dissolved in 1,1,1 trichloroethane (811 ml). A non-woven polyamide cloth 4 (maximum pore size 18 micrometers, thickness 0.3 mm; sold commercially as VILEDON FT 2118) was applied to the wet electrode surface. The electrode was then dried to give an electrochemical ion exchange electrode in which the current feeder was asymmetrically disposed within the ion-exchange material as shown in FIG. 1.

In use this electrode is sandwiched between an expanded mesh platinised titanium counter electrode and a sheet of polyethene, and fits closely in the recess in a sheet 8 or 9. Electrolyte undergoing treatment has easy access to the front surface 4 of the electrode, whereas access to the rear surface is considerably inhibited by the close fit of the electrode in the recess.

We claim:

1. A method of performing electrochemical ion exchange on an electrolyte which comprises the steps of:

(a) providing a counter electrode, (b) providing a working electrode having front and rear major surfaces and comprising a mixture of a particulate ion exchange material and a binder in contact with a permeable current feeder which has front and rear major surfaces, the mixture and the current feeder being bonded into a coherent structure such that at every part of the current feeder the thickness of the mixture on one major surface of the current feeder is less than that on the other major surface of the current feeder, such that gas electrogenerated at the current feeder during electrochemical ion exchange in contact with an electrolyte will diffuse from the current feeder into the electrolyte preferentially through that portion of the said mixture which is less thick, (c) contacting the electrolyte with said working electrode and said counter electrode, (d) and applying a voltage between the electrodes to induce electrochemical ion exchange, whereby gas electrogenerated at said current feeder diffuses therefrom into the electrolyte preferentially through that portion of the said mixture which is less thick.

2. A method as claimed in claim 1 wherein the thickness of material is substantially uniform over any one surface of the current feeder.

3. A method as claimed in claim 1 wherein at every part of the current feeder one surface of the feeder is substantially devoid of ion exchange material.

4. A method as claimed in claim 1 wherein the thickness of material, on the surface on which it is less, is less than 0.5 mm.

5. A method as claimed in claim 12 wherein the said less thickness is less than 0.2 mm.

6. A method as claimed in claim 1 also including a sheet of an inert electrolyte-permeable material adhering to a surface of the said coherent structure.

7. A method as claimed in claim 1 wherein the thickness of material is substantially uniform over each surface of the electrode, the electrode is supported within a duct of an electrochemical deionization apparatus by means for inhibiting flow of the liquid to the surface of the electrode at which the thickness of material is less, and a counter electrode is adjacent to the surface of the electrode at which the thickness of material is greater.

* * * * *

UNITED STATES PATENT AND TRADEMARK OFFICE
CERTIFICATE OF CORRECTION

PATENT NO. : 5,217,587

DATED : June 8, 1993

INVENTOR(S) : Nevill J. Bridger; Andrew D. Turner

It is certified that error appears in the above-indentified patent and that said Letters Patent is hereby corrected as shown below:

On the title page, item [54] and column 1, line 2, the title is changed to read --METHOD OF PERFORMING ELECTROCHEMICAL ION EXCHANGE USING IMPROVED ELECTRODE--.

The format of Claim 1 is changed as follows:

1. A method of performing electrochemical ion exchange on an electrolyte which comprises the steps of:
    (a) providing a counter electrode,
    (b) providing a working electrode having front and rear major surfaces and comprising a mixture of a particulate ion exchange material and a binder in contact with a permeable current feeder which has front and rear major surfaces, the mixture and the current feeder being bonded into a coherent structure such that at every part of the current feeder the thickness of the mixture on one major surface of the current feeder is less than that on the other major surface of the current feeder, such that gas electrogenerated at the current feeder during electrochemical ion exchange in contact with an electrolyte will

UNITED STATES PATENT AND TRADEMARK OFFICE
CERTIFICATE OF CORRECTION

PATENT NO. : 5,217,587
DATED : June 8, 1993
INVENTOR(S) : Nevill J. Bridger; Andrew D. Turner It is certified that error appears in the above—identified patent and that said Letters Patent is hereby corrected as shown below:

```
            diffuse from the current feeder into the
            electrolyte preferentially through that portion
            of the said mixture which is less thick,
     (c)    contacting the electrolyte with said working
            electrode and said counter electrode,
     (d)    and applying a voltage between the electrodes to
            induce electrochemical ion exchange,
whereby gas electrogenerated at said current feeder diffuses
therefrom into the electrolyte preferentially through that
portion of the said mixture which is less thick.
```

Signed and Sealed this

Fifteenth Day of February, 1994

Attest:

BRUCE LEHMAN

Attesting Officer        Commissioner of Patents and Trademarks